United States Patent
Ishibashi et al.

(10) Patent No.: US 8,267,314 B2
(45) Date of Patent: Sep. 18, 2012

(54) INFORMATION PROCESSING DEVICE, DISPLAY SWITCHING METHOD AND PROGRAM

(75) Inventors: Yoshihito Ishibashi, Tokyo (JP); Mamoru Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 386 days.

(21) Appl. No.: 12/630,264

(22) Filed: Dec. 3, 2009

(65) Prior Publication Data

US 2010/0147944 A1 Jun. 17, 2010

(30) Foreign Application Priority Data

Dec. 16, 2008 (JP) ................................ 2008-320220

(51) Int. Cl.
*G06K 5/00* (2006.01)
(52) U.S. Cl. ........................ 235/380; 235/375
(58) Field of Classification Search .................. 235/486, 235/375, 380, 439, 492, 384
See application file for complete search history.

(56) References Cited

U.S. PATENT DOCUMENTS

| 6,085,976 A * | 7/2000 | Sehr .............................. 235/384 |
| 2004/0046036 A1* | 3/2004 | Koshimizu et al. .......... 235/492 |

FOREIGN PATENT DOCUMENTS

| JP | 2003-208582 | 7/2003 |
| JP | 2008-21176 | 1/2008 |

* cited by examiner

*Primary Examiner* — Thien M Le
(74) *Attorney, Agent, or Firm* — Oblon, Spivak, McClelland, Maier & Neustadt, L.L.P.

(57) ABSTRACT

An information processing device including a light emitting unit to supply light to an operating unit mounted on an IC card, a light emission adjusting unit to cause information of an electronic ticket recorded on the IC card to be displayed on the display unit of the IC card by adjusting the number of times of emitting light or a light emitting pattern by the light emitting unit, a storage unit to store service identification information for identifying a service related to an electronic ticket, and a reading unit to read information of one or more than one electronic ticket stored in the IC card, and a determination unit to determine whether the information of the electronic ticket corresponding to the service identification information stored in the storage unit matches the information of one or more than one electronic ticket read by the reading unit.

8 Claims, 12 Drawing Sheets

| ADDRESS | DATA ITEM |
|---|---|
| : | : |
| X0 | DISPLAY REQUEST DATA |
| : | |
| X5 | |
| X6 | RESPONSE CONTROL DATA |
| : | : |
| Y0 | APPLICATION DATA 1 |
| : | |
| Y5 | |
| : | : |
| Z0 | APPLICATION DATA M |
| : | |
| Z5 | |
| : | : |

56

| ADDRESS | DATA ITEM |
|---|---|
| 01 | CARD IDENTIFIER |
| 02 | DISPLAY CONTROL DATA |
| 03 | DISPLAY SEQUENCE TABLE |
| : | : |
| K0 | |
| : | DISPLAY DATA 1 |
| K5 | |
| : | : |
| PA | |
| : | DISPLAY DATA N |
| PF | |

FIG. 9

| LIGHT EMITTING PATTERN | STATE OF LIGHT EMITTING SECTION | | | OPERATION OF IC CARD |
|---|---|---|---|---|
| | FIRST | SECOND | THIRD | |
| A | ON | ON | ON | DISPLAY |
| B | OFF | ON | ON | DISPLAY SWITCH (NEXT) |
| C | ON | ON | OFF | DISPLAY SWITCH (BACK) |
| D | OFF | OFF | OFF | NO DISPLAY |

FIG. 10

| | USE STATUS 4001 | PURCHASE DATE 4002 | EXPECTED USE DATE 4003 | USE DATE 4004 | SERVICE CODE 4005 | USE PLACE 4006 | TIME 4007 | DESTINATION 4008 | TRAIN NAME 4009 | CAR NO. 4010 | SEAT NO. 4011 | ATTRIBUTE INFORMATION 4012 |
|---|---|---|---|---|---|---|---|---|---|---|---|---|
| TICKET 1 | USED | 20081012 | 20081101 | 20081101 | 1000 | TOKYO 0001 | 8:00 10:20 | SENDAI | HAYATO 5 | 6 | 5-A | RESERVED |
| TICKET 2 | UNUSED | 20081115 | 20081225 | 20081225 | 1000 | TOKYO 0001 | 12:00 13:20 | UTSUNOMIYA | YAMABUSHI 35 | 3 | 10-C | FIRST-CLASS |
| TICKET 3 | UNUSED | 20081130 | 20081205 | | 2000 | SHIBUYA 2005 | 16:30 | - | - | - | 16C | MOVIE 1 |
| TICKET 4 | UNUSED | 20081218 | 20081230 | | 1000 | SENDAI | 10:00 12:30 | TOKYO | HAYATO 66 | - | | NONRESERVED |
| TICKET 5 | UNUSED | 20080915 | | | 5000 | | - | - | - | - | - | DEPARTMENT STORE 110000 |

<TOKYO STATION> 501

| CURRENT TIME | SERVICE CODE | OTHER |
|---|---|---|
| 20081225 10:39 | 1000 | |

<TOKYO STATION: PLATFORM> 502

| CURRENT TIME | SERVICE CODE | DEPARTURE TIME | TRAIN NAME |
|---|---|---|---|
| 20081225 10:39 | 1000 | 12:00 | YAMABUSHI 35 |
| 20081225 10:39 | 1000 | 13:00 | YAMABUSHI 40 |

<SHIBUYA CITY: MOVIE THEATER> 503

| CURRENT TIME | SERVICE CODE | MOVIE THEATER | START TIME | MOVIE TITLE |
|---|---|---|---|---|
| 20081225 10:39 | 2000 | 2005 | 16:30 | MOVIE 1 |
| 20081225 10:39 | 2000 | 2005 | 19:00 | MOVIE 1 |

INFORMATION PROCESSING DEVICE, DISPLAY SWITCHING METHOD AND PROGRAM

BACKGROUND OF THE INVENTION

1. Field of the Invention

The present invention relates to an information processing device, a display switching method and a program.

2. Description of the Related Art

IC cards are widely used today that are capable of recording a large volume of information by incorporating semiconductor memory such as RAM, ROM or EEPROM. Various kinds of information such as balance information in electronic payments, electronic ticket information for transportation or amusement facilities, or coupon information used for shopping, for example, are written to IC cards through a reader/writer.

Instances of technological development for enhancing the convenience of IC cards are as follows. Japanese Unexamined Patent Application Publication No. 2003-208582, for example, discloses an IC card that has a display device such as an electronic paper or an LCD panel on its surface and is thus capable of displaying recorded information for a user. Further, Japanese Unexamined Patent Application Publication No. 2008-21176, for example, discloses an IC card that includes a means of generating power by photoelectric conversion such as a solar battery and is capable of displaying information on a display device even at a distance from a reader/writer with use of power generated by the power generating means.

On the other hand, the amount of information that can be displayed at a time on a display device mounted on an IC card is generally smaller than the amount of information that can be recorded on the IC card. Therefore, an operating means for displaying desired information from a plurality of pieces of recorded information is mounted on an IC card in some cases. In such a case, a user can display desired information on a display device of an IC card by manipulating an operating means mounted on the IC card.

SUMMARY OF THE INVENTION

However, it has been difficult for a user to grasp all information recorded on an IC card and switch display to optimum information according to the peripheral environment such as a place where the user uses an electronic ticket or time when the user uses an electronic ticket. Further, if optimum information according to the peripheral environment is automatically displayed on a display device of an IC card, a user can act depending on display of the IC card, which is convenient. This easily allows a user to move to the place for use by the time for use.

In light of the foregoing, it is desirable to provide a novel and improved information processing device, display switching method and program that enable display of information suitable for the peripheral environment, selected from information written to an IC card, on the IC card.

According to an embodiment of the present invention, there is provided an information processing device comprising including a light emitting unit to supply light to an operating means mounted on an IC card and capable of switching display contents on a display unit of the IC card by a potential difference occurring due to photoelectric conversion, a light emission adjusting unit to cause information of an electronic ticket recorded on the IC card to be displayed on the display unit of the IC card by adjusting the number of times of emitting light or a light emitting pattern by the light emitting unit, a storage unit to store service identification information for identifying a service related to an electronic ticket, and a reading unit to read information of one or more than one electronic ticket stored in the IC card. The light emission adjusting unit adjusts the number of times of emitting light or the light emitting pattern by the light emitting unit so as to switch display on a display screen of the IC card to the information of the electronic ticket corresponding to the service identification information.

In this configuration, the information processing device includes the light emitting unit to supply light to the operating means mounted on the IC card and capable of switching display contents on the display unit of the IC card by a potential difference occurring due to photoelectric conversion. The reading unit reads information of one or more than one electronic ticket stored in the IC card, and the light emission adjusting unit adjusts the number of times of emitting light or the light emitting pattern by the light emitting unit so as to switch display on the display screen of the IC card to the corresponding information of the electronic ticket. It is thereby possible to automatically display the electronic ticket information suitable for the peripheral environment such as a user's location or current time on the display unit of the IC card 20.

The information processing device may further include a determination unit to determine whether the information of the electronic ticket corresponding to the service identification information stored in the storage unit matches the information of one or more than one electronic ticket read by the reading unit. The light emission adjusting unit may adjust the number of times of emitting light or the light emitting pattern by the light emitting unit so as to switch display on the display screen of the IC card to the information of the electronic ticket corresponding to the service identification information based on a determination result of the determination unit.

The light emitting unit may be capable of supplying light to the operating means by a first light emitting pattern for driving the display unit of the IC card and a second light emitting pattern for switching display contents on the display unit of the IC card.

The reading unit may acquire a stored location of one or more than one electronic ticket on memory of the IC card, and the light emission adjusting unit may determine the number of times of emitting light or the light emitting pattern by the light emitting unit according to the stored location of the information of the electronic ticket corresponding to the service identification information.

The information of an electronic ticket may contain at least one information of a kind, a use date and a use place of the electronic ticket, and the service identification information may contain at least one information of a kind, time information and place information of the electronic ticket.

The light emission adjusting unit may switch display on the display screen of the IC card to the information of the electronic ticket if it is determined that the information of the electronic ticket corresponding to the kind, time information and place information of the electronic ticket contained in the service identification information entirely or partly match the information stored in the IC card.

The light emission adjusting unit may stop supply of light from the light emitting unit while the information processing device communicates with the IC card.

The reading unit may stop communication between the IC card and the information processing device while light is supplied from the light emitting unit to the operating means of the IC card.

The IC card may incorporate an IC chip capable of contactless communication with the information processing device, and the information processing device may be a reader/writer capable of contactless communication with the IC card.

According to another embodiment of the present invention, there is provided a display switching method including reading information of one or more than one electronic ticket stored in an IC card by a reading unit, determining whether the information of the electronic ticket corresponding to service identification information for identifying a service related to an electronic ticket stored in an information processing device matches the information of one or more than one electronic ticket read by the reading unit, supplying light from a light emitting unit to an operating means mounted on the IC card and capable of switching display contents on a display unit of the IC card by a potential difference occurring due to photoelectric conversion, and displaying the information of the electronic ticket corresponding to the service identification information on the IC card by the number of times of emitting light or the light emitting pattern of the light emitting unit adjusted based on a result of the determination.

According to another embodiment of the present invention, there is provided a program causing a computer controlling an information processing device including a light emitting unit to supply light to an operating means mounted on an IC card and capable of switching display contents on a display unit of the IC card by a potential difference occurring due to photoelectric conversion to function as an information processing device including a light emission adjusting unit to cause information of an electronic ticket recorded on the IC card to be displayed on a display unit of the IC card by adjusting the number of times of emitting light or a light emitting pattern by the light emitting unit, a storage unit to store service identification information for identifying a service related to an electronic ticket, and a reading unit to read information of one or more than one electronic ticket stored in the IC card. The light emission adjusting unit adjusts the number of times of emitting light or the light emitting pattern by the light emitting unit so as to switch display on a display screen of the IC card to the information of the electronic ticket corresponding to the service identification information.

According to the embodiments of the present invention described above, it is possible to display information suitable for the peripheral environment, selected from information written to an IC card, on the IC card.

BRIEF DESCRIPTION OF THE DRAWINGS

FIG. 9 is an explanatory view to describe light emitting patterns of a light emitting unit according to an embodiment.

FIG. 10 is an explanatory view to describe specific contents of electronic tickets stored in an IC card according to an embodiment.

FIG. 11 is an explanatory view to describe specific contents of service identification information stored in a storage unit of an information processing device according to an embodiment.

DETAILED DESCRIPTION OF THE EMBODIMENT(S)

Figure 1:
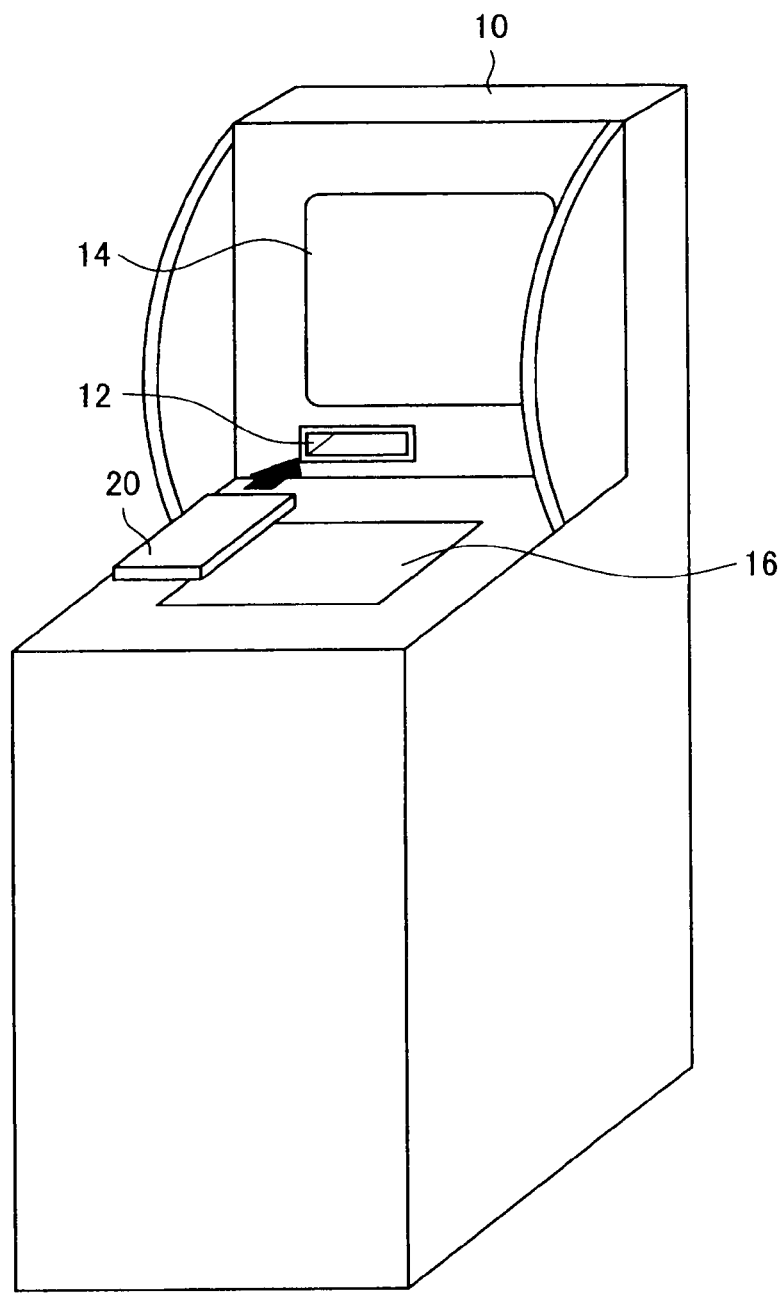
FIG. 1 is a schematic view showing an information processing device according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be described hereinafter in the following order.

[1] Object of Embodiment
[2] Outline of Information Processing Device
[3] Explanation of IC Card Related to the Present Invention
[3-1] Appearance of IC Card
[3-2] Internal Configuration of IC Card
[3-3] Exemplary Data Structure
[3-4] Display Processing by IC Card
[4] Functional Configuration of Information Processing Device
[5] Operation of Information Processing Device
[1] Object of Embodiment An object of an embodiment of the present invention is described hereinafter. IC cards are widely used today that are capable of recording a large volume of information by incorporating semiconductor memory such as RAM, ROM or EEPROM. Various kinds of information such as balance information in electronic payments, electronic ticket information for transportation or amusement facilities, or coupon information used for shopping, for example, are written to IC cards through a reader/writer.

An example of technological development for enhancing the convenience of IC cards are an IC card that has a display device such as an electronic paper or an LCD panel on its surface and is thus capable of displaying recorded information for a user. Another such example is an IC card that includes a means of generating power by photoelectric conversion such as a solar battery and is capable of displaying information on a display device even at a distance from a reader/writer with use of power generated by the power generating means.

On the other hand, the amount of information that can be displayed at a time on a display device mounted on an IC card is generally smaller than the amount of information that can be recorded on the IC card. Therefore, an operating means for displaying desired information from a plurality of pieces of recorded information is mounted on an IC card in some cases. In such a case, a user can display desired information on a display device of an IC card by manipulating an operating means mounted on the IC card.

However, it has been difficult for a user to grasp all information recorded on an IC card and display optimum information according to the peripheral environment such as the user's location or current time. Further, because an IC card with a display function does not incorporate a time function, it has been difficult to appropriately display information such as an electronic ticket to be used.

Furthermore, in a service of issuing a reserved seat ticket of rail or air transportation or the like, only a paper ticket is issued or a seat confirmation paper on which seat information or the like is printed is issued in addition to that seat information is written to an IC card. A user then recognizes an assigned seat by looking at the paper ticket or the paper with seat information or the like printed. If optimum information according to the peripheral environment such as the location or the current time is displayed on a display device of the IC card, a user can act depending on display of the IC card without using the seat confirmation paper. This allows a user to keep only the IC card, not both the IC card and the paper, which is convenient.

In view of the foregoing, an information processing device 10 according to an embodiment of the present invention has been invented. With use of the information processing device 10 according to the embodiment, it is possible to display information suitable for the peripheral environment, selected from information written to an IC card, on the IC card.

[2] Outline of Information Processing Device

An outline of the information processing device 10 according to an embodiment of the present invention is described hereinafter with reference to FIG. 1. FIG. 1 is a schematic view showing the information processing device 10 according to the embodiment. FIG. 1 also shows an IC card 20 capable of communicating with the information processing device 10.

Referring to FIG. 1, the information processing device 10 includes an IC card holding unit 12, a display unit 14, a key input unit 16 or the like, for example.

The IC card holding unit 12 has a function of holding an IC card 20 when displaying optimum information from information recorded on the IC card. The depth of the IC card holding unit 12 may be such that the IC card 20 is entirely hidden. Although a structure of inserting a card is shown in this embodiment, a structure may be such that the IC card holding unit 12 has a pocket-like shape so that a card is inserted from above.

The display unit 14 displays given information, such as information related to control of the information processing device 10, information read from an IC card or information written to an IC card, to a user.

The key input unit 16 includes a button, a switch, a lever, a key or the like for a user to operate the information processing device 10. The display unit 14 and the key input unit 16 may be integrated with use of a touch panel or the like, for example.

Further, an external communication device that allows the information processing device 10 to communicate with an external device, a printing device that prints out given information onto a paper medium (both not shown) or the like may be additionally mounted on the information processing device 10 according to need.

Although FIG. 1 shows a stationary machine as an example of the information processing device 10, the information processing device 10 is not limited to such an example. For example, the IC card holding unit 12 may be connected to a PC or the like so that the IC card is inserted thereto, or the information processing device 10 may be a register type device.

[3] Explanation of IC Card Related to the Present Invention

[3-1] Appearance of IC Card

Figure 2:
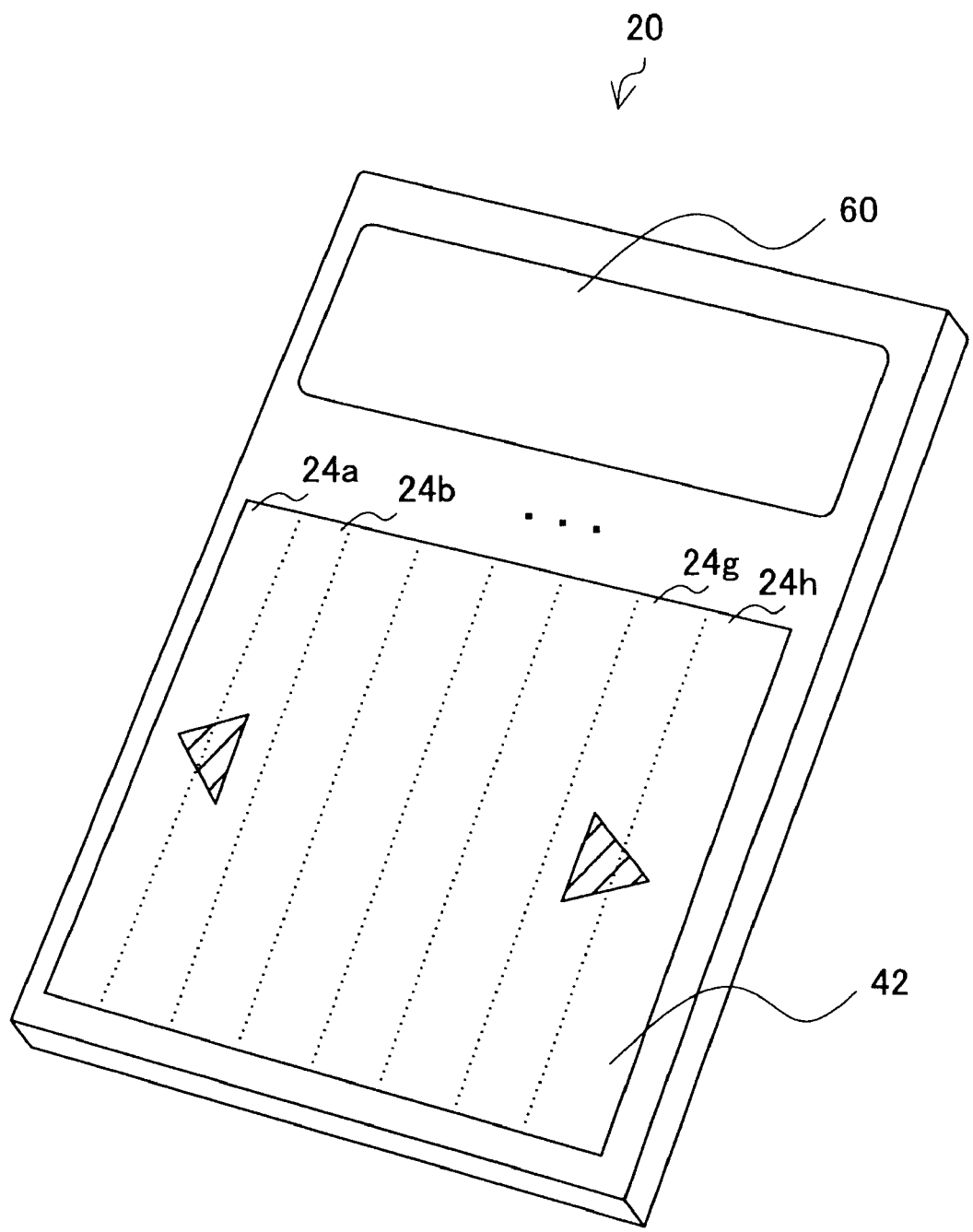
FIG. 2 is a schematic view showing an example of an appearance of an IC card related to the present invention.

The outline of the information processing device 10 is described above. Hereinafter, the IC card 20, the use of which is assumed in the embodiment, is described. FIG. 2 is a schematic view showing an appearance of the IC card 20. Referring to FIG. 2, the IC card 20 includes an operating unit 42 and a display unit 60 on its outside.

The display unit 60 is configured as a display device using an LCD (Liquid Crystal Display), an OLED (Organic Light Emitting Diode) or the like, for example. The display unit 60 displays data read from memory of the IC card 20 based on control by a control unit (not shown) placed inside the IC card 20.

The operating unit 42 serves as an operating means capable of switching display contents on the display unit 60 according to a potential difference caused by photoelectric conversion. For example, the operating unit 42 may be configured as a set of solar batteries in which eight cells 24a to 24h are connected in series as shown in FIG. 2. An electromotive force of each cell of the solar battery is determined according to the load and the amount of light received. Therefore, if a user covers any of such cells with a finger, a change occurs in potential difference according to an electromotive force of each cell, and the IC card 20 can recognize the operation by the user.

For example, if the cell 24g and the cell 24h are covered in the arrangement of the cells in FIG. 2, the IC card 20 may switch the display contents on the display unit 60 in a particular direction (e.g. "next" etc.). Further, if the cell 24a and the cell 24b are covered, the IC card 20 may switch the display contents on the display unit 60 in the opposite direction (e.g. "back" etc.). The arrangement of the cells in the operating unit 42 is not limited to such an example. For example, an operation of either one direction of "next" or "back" may be recognizable in the operating unit 42.

Further, the operating unit 42 also serves as a power generating means that generates power for driving the display unit 60, as further described later.

The appearance of the IC card 20 is not limited thereto. For example, the size, position, orientation or the like of the operating unit 42 or the display unit 60 may be varied in any way according to use of the IC card 20.

The surfaces of the cells 24a to 24h of the operating unit 42 are preferably covered with a protective film for preventing scratches or breakage due to external contact or stimulus. In this case, by using a light collecting material as a material of the protective film, an electromotive force of each cell by photoelectric conversion increases, which improves the continuous display time or the allowable power consumption of the display unit 60.

[3-2] Internal Configuration of IC Card

Figure 3:
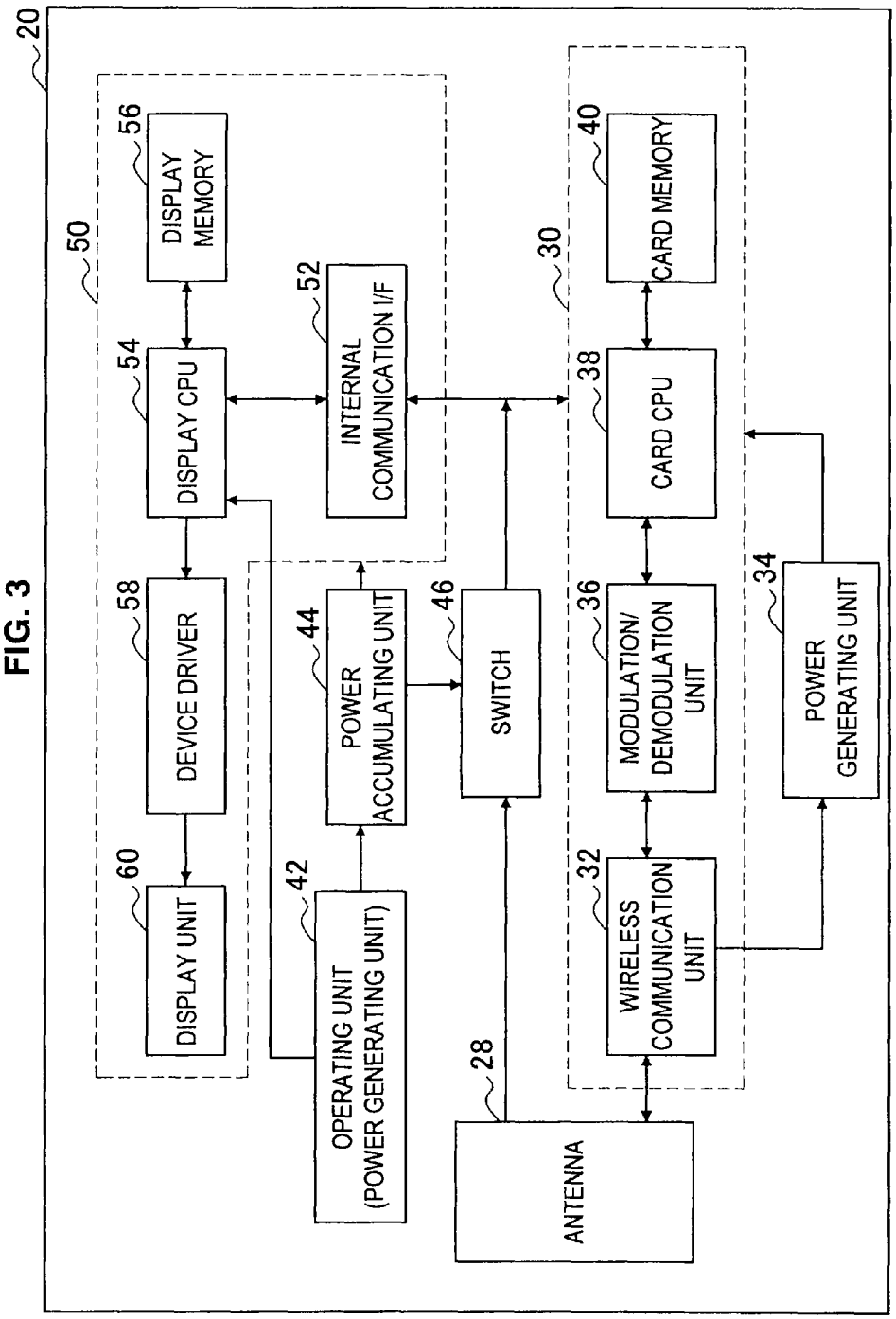
FIG. 3 is a block diagram showing an example of a configuration of an IC card related to the present invention.

The IC card 20 has the internal configuration shown in FIG. 3, which is described hereinbelow. FIG. 3 is a block diagram showing an example of a configuration of the IC card 20. Referring to FIG. 3, the IC card 20 includes an antenna 28, an IC card module 30, a power generating unit 34, an operating unit (power generating unit) 42, a power accumulating unit 44, a switch 46 and a display module 50.

The IC card module 30 includes a wireless communication unit 32, a modulation/demodulation unit 36, a card CPU (Central Processing Unit) 38, and card memory 40. The display module 50 includes an internal communication I/F (interface) 52, a display CPU 54, display memory 56, a device driver 58 and a display unit 60.

In the case where the IC card 20 receives a signal, an electromagnetic wave received by the antenna 28 is amplified by the wireless communication unit 32 of the IC card module 30 and supplied to the modulation/demodulation unit 36. The modulation/demodulation unit 36 performs envelope detection of the modulated wave (ASK-modulated wave) supplied from the wireless communication unit 32 and demodulates the modulated wave according to BPSK (Binary Phase Shift Keying) or the like. Then, the modulation/demodulation unit 36 outputs an input signal obtained by demodulation to the card CPU 38.

The card CPU 38 controls the operation of the IC card module 30 as a whole. For example, the card CPU 38 records the data contained in the input signal onto a prescribed write location of the card memory 40 or outputs an execution result of a prescribed command designated by the input signal to the modulation/demodulation unit 36. The card memory 40 records a program to be executed by the card CPU 38, control data, application data such as electronic ticket information or the like with use of semiconductor memory such as ROM or flash memory, for example.

In the case where the IC card 20 transmits a signal, an output signal is output from the card CPU 38 to the modulation/demodulation unit 36. The output signal contains data read from the card memory 40, an execution result of a prescribed command or the like, for example. The modulation/demodulation unit 36 modulates the output signal according to BPSK or the like, for example, and generates an ASK-modulated wave. Then, the modulation/demodulation unit 36 outputs the generated modulated wave to the wireless communication unit 32. The wireless communication unit 32 supplies the modulated wave input from the modulation/demodulation unit 36 to the antenna 28, and the output signal is transmitted from the antenna 28 by emission of an electromagnetic wave.

The power generating unit 34 resonates the electromagnetic wave received by the antenna 28 with use of an LC circuit composed of the antenna 28 and a capacitor (not shown), for example. The power generating unit 34 then rectifies an excited alternating-current magnetic field, stabilizes it by a voltage regulator or the like, and supplies it as power of a direct-current power supply to the IC card module 30, for example.

On the other hand, the operating unit 42 is an operating means based on a potential difference caused by photoelectric conversion and also serves as a power generating means with use of a solar battery, for example, as described earlier with reference to FIG. 2. Specifically, the operating unit 42 photoelectrically converts externally received light (sunlight or light emitted from another light source) to generate power, and supplies the generated power to the power accumulating unit 44, for example.

Further, the operating unit 42 detects a potential difference corresponding to an electromotive force of each of the cells 24a to 24h shown in FIG. 2 and recognizes an operation by a user. Then, the operating unit 42 outputs an operating signal indicating descriptions of the detected operation to the display CPU 54. The operating signal may be a signal designating "next" or "back" as a direction to switch the display contents on the display unit 60, for example.

The power accumulating unit 44 accumulates the power supplied from the operating unit (power generating unit) 42 with use of a capacitor or the like, for example. The power accumulating unit 44 then supplies the accumulated power to the display module 50 and thereby drives the display module 50. The power accumulating unit 44 also supplies the accumulated power to the switch 46.

The switch 46 switches between an access from the display module 50 to the IC card module 30 and an access from the outside (the outside of the IC card 20) to the IC card module 30. For example, the switch 46 blocks an access from the display module 50 to the IC card module 30 when the antenna 28 receives an electromagnetic wave emitted from the information processing device 10 shown in FIG. 1. Further, for example, the switch 46 permits an access from the display module 50 to the IC card module 30 when the switch 46 receives power supply from the power accumulating unit 44 in the state where the antenna 28 does not receive an electromagnetic wave.

The display CPU 54 of the display module 50 executes a program stored in ROM (not shown) or the like, for example, and controls the operation of the display module 50 as a whole. For example, the display CPU 54 accesses the IC card module 30 through the internal communication I/F 52 and acquires the data recorded on the card memory 40. Further, the display CPU 54 records the acquired data as display data onto the display memory 56. Furthermore, the display CPU 54 acquires the display data from the display memory 56 at predetermined timing such as activation of the display module 50, for example, and displays the acquired display data on the display unit 60.

The internal communication I/F 52 allows an access from the display CPU 54 to the IC card module 30 by generating a signal equal to a command to be provided from the IC card module 30 to an external device, for example. The display CPU 54 can thereby acquire the data recorded on the card memory 40.

The display memory 56 stores control data, display data acquired from the card memory 40 by the display CPU 54 or the like, with use of semiconductor memory such as flash memory, for example. The descriptions of data recorded on the display memory 56 are described more specifically later.

The device driver 58 drives the display unit 60, which is a display device mounted on the IC card 20, according to control by the display CPU 54.

The display unit 60 is configured as a display device using an LCD or the like as described earlier with reference to FIG. 2. The display unit 60 displays the display data acquired from the display memory 56 by the display CPU 54, for example, on its screen.

The appearance and the internal configuration of the IC card 20, the use of which is assumed in an embodiment of the present invention, are described above with reference to FIGS. 2 and 3. As is understood from the above description, the IC card module 30 of the IC card 20 receives power supply and operates only while the antenna 28 is receiving an electromagnetic wave. On the other hand, the display module 50 of the IC card 20 can display data on the display unit 60 with use of power accumulated in the power accumulating unit 44 even if the IC card 20 is located in a place away from a reader/writer such as the information processing device 10 shown in FIG. 1, for example.

Although the case where the IC card 20 is a contactless IC card is described above by way of illustration, the IC card 20 is not limited to a contactless IC card. If the IC card 20 is a contact IC card, a terminal and a communication unit, instead of the antenna 28 and the wireless communication unit 32, may be mounted on the IC card 20, for example.

[3-3] Exemplary Data Structure

A structure of data related to the embodiment, among data recorded on the card memory 40 and the display memory 56 of the IC card 20, is described hereinafter.

(1) Exemplary Data Structure of Card Memory

Figure 4:
FIG. 4 is an explanatory view showing an example of a partial data structure of data recorded on card memory.

FIG. 4 is an explanatory view showing an example of a partial data structure of data recorded on the card memory 40 shown in FIG. 3.

Referring to FIG. 4, display request data is recorded at addresses X0 to X5, response control data is recorded at an address X6, application data 1 to application data M are recorded at addresses Y0 to T5 and subsequent addresses, respectively on the card memory 40.

The display request data is data for making a request for display from the IC card module 30 (or an external device) to the display module 50. In response to an instruction from an external device, the card CPU 38 of the IC card module 30 writes the display request data related to given application such as an electronic ticket or an electronic coupon to the addresses X0 to X5. The display request data may be any data that can be displayed on the display unit 60 of the display module 50, such as text data or bitmap data, for example.

The response control data is data for controlling a display request from the IC card module 30 to the display module 50 and a response. For example, in response to an instruction from an external device, the card CPU 38 of the IC card module 30 writes data requested to be displayed onto the display request data and further writes a prescribed bit string designating acquisition of the display request data by the display module 50 onto the response control data.

Further, the display CPU 54 of the display module 50 writes a prescribed bit string indicating a success of acquisition of the display request data onto the response control data when acquisition of the display request data succeeds, for example. On the other hand, the display CPU 54 writes a prescribed bit string (error code) indicating a failure of acquisition of the display request data onto the response control data when acquisition of the display request data fails, for example. The kind of an error (a data length error, a command error etc.) may be identifiable by the value of an error code, for example.

With use of such response control data, the status of data coordination between the IC card module 30 and the display module 50 is shared with an external device. It is thereby possible to prevent data inconsistency between the IC card module 30 and the display module 50 by inhibiting writing of new data from an external device until acquisition of the display request data by the display module 50 is completed, for example.

The application data 1 to the application data M are arbitrary data related to various applications provided by the IC card 20. The application data 1 to the application data M may contain balance information, electronic ticket information, coupon information or the like, for example, as described earlier.

The balance information that is likely to be used in common by a plurality of applications may be held at a particular address which is different from the application data 1 to the application data M, not restricted to the example of FIG. 4. Further, the card memory 40 may store any data other than the data shown in FIG. 4.

(2) Exemplary Data Structure of Display Memory

Figure 5:
FIG. 5 is an explanatory view showing an example of a data structure of data recorded on display memory.

FIG. 5 is an explanatory view showing an example of a data structure of data recorded on the display memory 56 shown in FIG. 3.

Referring to FIG. 5, a card identifier is recorded at an address 01, display control data is recorded at an address 02, a display sequence table is recorded at an address 03, and display data 1 to display data N are recorded at addresses K0 to K5 and subsequent addresses, respectively on the display memory 56.

The card identifier is an identifier for identifying an individual piece of the IC card module 30 to be accessed by the display module 50. Generally, when an external device makes an access to the IC card, a polling command is issued from the external device, and the card identifier is acquired in response thereto. The external device can thereby identify the IC card to be communicated with from a plurality of IC cards.

On the other hand, in this embodiment, a combination of the IC card module 30 and the display module 50 that are incorporated in the IC card 20 does not change. Thus, by recording the card identifier that identifies an individual piece of the IC card module 30 onto the display memory 56 in advance, it is possible to eliminate the polling processing and thereby reduce the power consumption and the processing time in the IC card 20. The card identifier may be acquired by a polling command upon initial startup after the display module 50 is incorporated into the IC card 20, or may be written by a manufacturing device during manufacture.

The display control data is data for controlling display processing by the display module 50. For example, the display control data contains address data such as a memory address at which the response control data is stored in the card memory 40 of the IC card module 30.

The display sequence table defines in what sequence the display data 1 to the display data N at the addresses K0 to K5 and subsequent addresses are displayed on the display unit 60. The display sequence table may be data that lists the addresses (or block numbers etc.) of the display data 1 to the display data N in the sequence of displaying the data on the display unit 60, for example. Further, the display sequence table may contain data that defines the kind of display sequence such as a sequence of memory or a sequence of date.

Furthermore, the display sequence table may contain an address of initial display data to be displayed initially on the display unit 60. A plurality of display sequence tables may be recorded on the display memory 56. In this case, serial numbers may be assigned to the respective display sequence tables, for example, and a display sequence of data on the display unit 60 may be selected as appropriate from a plurality of patterns.

The display data 1 to the display data N are data that can be displayed on the display unit 60. As described earlier, the display CPU 54 records the display request data acquired from the card memory 40 of the IC card module 30 as display data onto any memory location of the display data 1 to the display data N. Then, the display data is read by the display CPU 54 in the sequence according to the display sequence table and displayed on the display unit 60.

An example of the data structure of data that can be recorded on the card memory 40 and the display memory 56 of the IC card 20 is described above with reference to FIGS. 4 and 5. Hereinafter, display processing executed by the IC card 20 is described.

[3-4] Display Processing by IC Card

Figure 6:
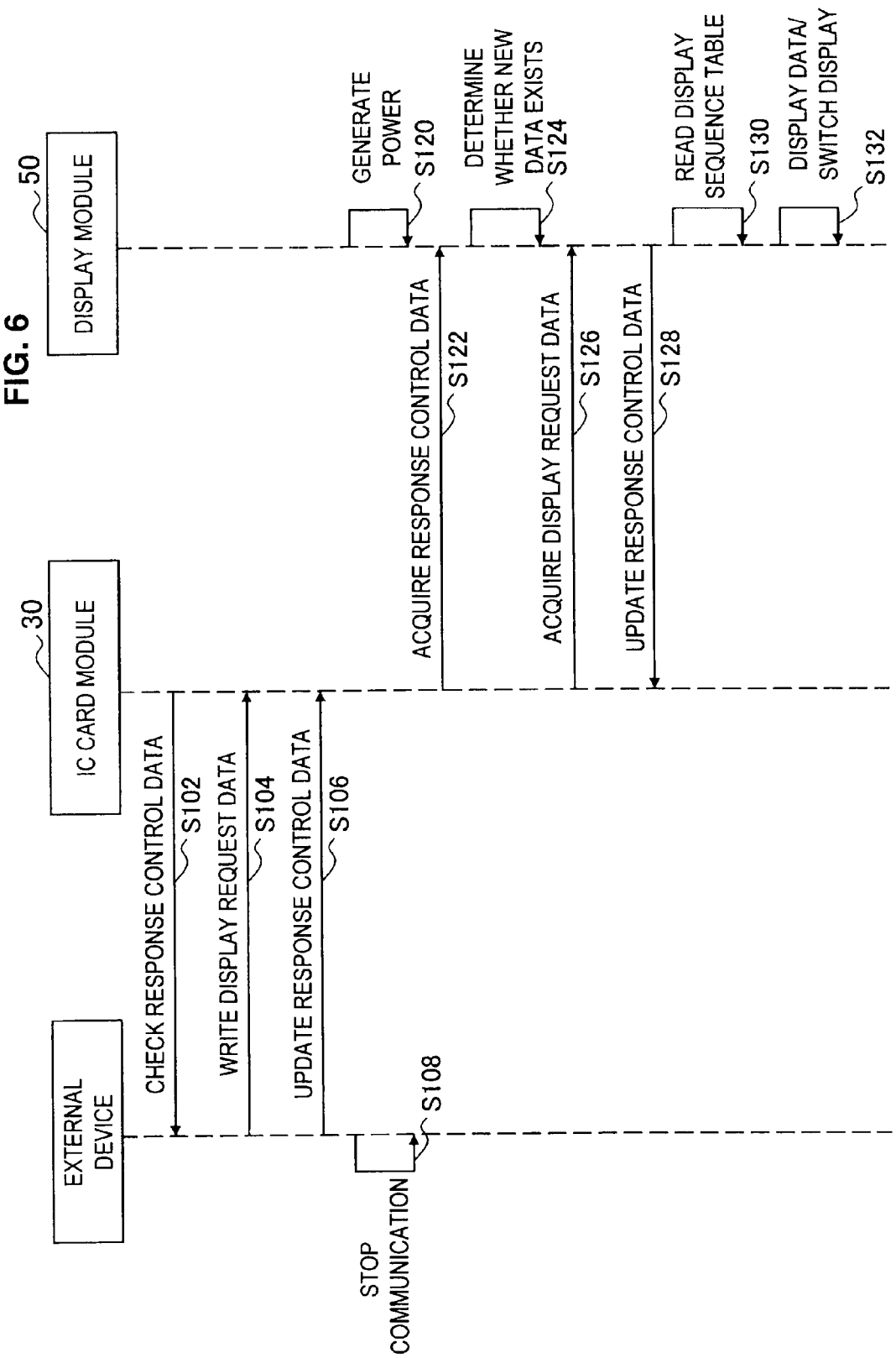
FIG. 6 is a sequence chart showing an example of a flow of display processing by an IC card related to the present invention.

FIG. 6 is a sequence chart showing an example of a flow of display processing by the IC card 20. FIG. 6 shows processing after writing of data from an external device such as a reader/writer to the IC card 20 is started until the data is displayed on the display unit 60 of the IC card 20.

Referring to FIG. 6, the external device first acquires the response control data from the card memory 40 in the IC card module 30 and checks whether the display request data that is not yet captured into the display module 50 remains or not (S102). If the response control data indicates that there remains the uncaptured display request data, the external device cancels the subsequent processing. On the other hand, there is no uncaptured display request data remaining, the display request data is written to the card memory 40 of the IC card module 30 in response to an instruction from the external device (S104).

For efficient processing, it is suitable to write the application data corresponding to the display request data simultaneously to the card memory 40. Further, the external device updates the response control data on the card memory 40 to a prescribed bit string that designates data acquisition by the display module 50 (S106). After that, the external device stops emission of an electromagnetic wave from its own device and waits for acquisition of the display request data by the display module 50 (S108).

After that, when the operating unit (power generating unit) 42 of the IC card 20 receives light and power high enough to drive the display module 50 is accumulated in the power accumulating unit 44, the display module 50 is activated (S120). Then, the display CPU 54 of the display module 50 accesses the IC card module 30 and acquires the response control data recorded on the card memory 40 (S122).

The display CPU 54 then determines whether new display request data is written or not by referring to the bit string of the response control data (S124). If the new display request data is not written, the processing in the subsequent steps S126 and S128 is skipped. If, on the other hand, the new display request data is written, the display CPU 54 accesses the IC card module 30 and acquires the display request data recorded on the card memory 40, and writes the acquired data to the display memory 56 (S126). Further, if the display CPU 54 successfully acquires the display request data, the display CPU 54 updates the response control data on the card memory 40 to a prescribed bit string that indicates a success of acquisition of the display request data (S128).

Then, the display CPU 54 reads the display sequence table from the display memory 56 (S130) and displays the display data 1 to N on the display unit 60 sequentially according to the display sequence table (S132). At this time, if the display CPU 54 detects that an operation designating switching of display contents is performed through the operating unit 42, the display CPU 54 switches the display data being displayed on the display unit 60 into other display data.

Compared to the communication processing from S122 to S128 by the display module 50, a high processing speed is not demanded for the display processing after S130. For example, while a processing speed of the communication processing is about several tens of MHz, a processing speed of the display processing can be about several tens of kHz. Therefore, the display module 50 can save power consumption by temporarily increasing a processing clock speed only during the steps S122 to S128.

The IC card 20 can thereby display the data written from the external device for a user. By using the information processing device 10 according to an embodiment of the present invention, which is described hereinbelow, as the external device, it is possible to display information suitable for the peripheral environment, such as user's location or time information, on an IC card.

[4] Functional Configuration of Information Processing Device

Figure 7:
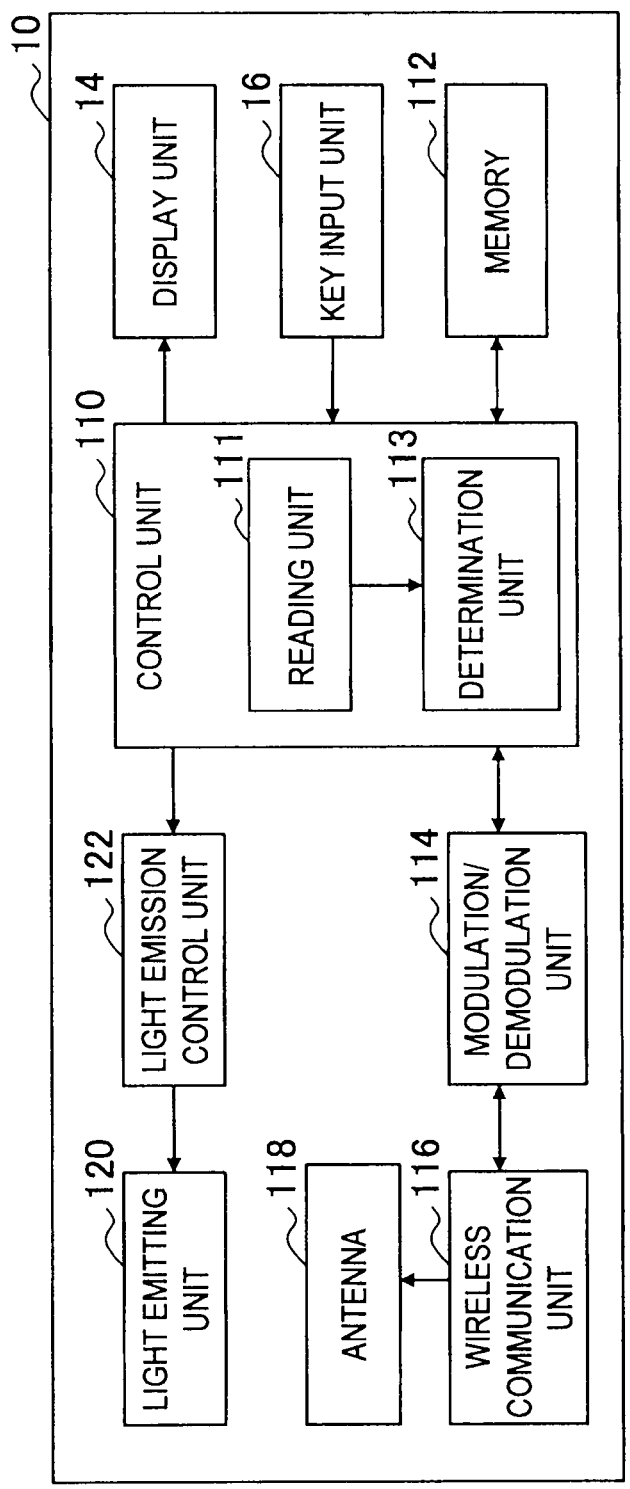
FIG. 7 is a block diagram showing an example of a configuration of an information processing device according to an embodiment.

A functional configuration of the information processing device 10 is described hereinafter with reference to FIG. 7. FIG. 7 is a block diagram showing a functional configuration of the information processing device 10 according to the embodiment. Referring to FIG. 7, the information processing device 10 includes a display unit 14, a key input unit 16, a control unit 110, memory 112, a modulation/demodulation unit 114, a wireless communication unit 116, an antenna 118, a light emitting unit 120 and a light emission adjusting unit 122. The control unit 110 principally includes a reading unit 111, a determination unit 113 or the like.

The control unit 110 executes a program recorded on the memory 112, for example, by using an arithmetic unit such as a CPU or an MPU, and thereby controls the operation of the information processing device 10 as a whole. For example, the control unit 110 transmits a prescribed data write command to the IC card 20 through the modulation/demodulation unit 114, the wireless communication unit 116 and the antenna 118.

The control unit 110 principally includes the reading unit 111, the determination unit 113 or the like. The reading unit 111 has a function of reading information of one or more than one electronic ticket stored in the IC card 20. Further, the reading unit 111 acquires the stored location of the electronic ticket on memory of the IC card 20. As described earlier, display request data related to given application such as an electronic ticket is written to the card memory 40 of the IC card 20. Thus, the reading unit 111 acquires information of an electronic ticket and an address where the electronic ticket is written. The reading unit 111 supplies the information of the electronic ticket read from the IC card 20 to the determination unit 113. Reading of information of an electronic ticket by the reading unit 111 is described in detail later.

The determination unit 113 has a function of determining whether information of an electronic ticket corresponding to service identification information that is stored in the memory 112, which is described later, matches the information of one or more than one electronic ticket that is read by the reading unit 111. The service identification information is information for identifying a service related to an electronic ticket. The service related to a ticket is a reserved seat ticket issuing service for an express train, an air ticket issuing service for an airplane, a reserved seat ticket issuing service for a movie theater or the like, for example. Specifically, the service identification information is a bit code for identifying such a service, which is contained in information of an electronic ticket stored in the IC card 20.

On the other hand, the service identification information is stored in the memory 112, which is described later, and the service identification information stored in the memory 112 is not limited to the above-described service code but may be information such as the location of the information processing device 10 or the current time. The determination unit 113 compares information about the location, the current time or the service of the information processing device 10 with information of an electronic ticket stored in the IC card 20.

For example, a service code in the case where the information processing device 10 is installed near ticket gates at Tokyo station is considered to be a reserved seat ticket issuing service code for an express train. In this case, the determination unit 113 retrieves an electronic ticket having service identification information of an express train reserved seat ticket issuing service from the electronic tickets stored in the IC card 20. Further, if a plurality of electronic tickets for express train reserved seat tickets are stored, an electronic ticket closest to the current time is retrieved.

Further, the determination unit 113 specifies the stored location of the retrieved information of the electronic ticket on the memory of the IC card 20. Specifically, the determination unit 113 retrieves information of an electronic ticket corresponding to service identification information and further acquires an address at which the electronic ticket is written and then provides it to the light emission adjusting unit 122.

It is thereby possible to display information such as an electronic ticket suitable for the peripheral environment on an IC card by simply inserting the IC card into the IC card holding unit 12 by a user. Specific contents of the electronic ticket and the service identification information are described in detail later.

The memory 112 stores a program to be executed by the control unit 110, control data or the like by using semiconductor memory such as ROM or flash memory, for example. The memory 112 further stores the service identification information for identifying the service related to the electronic ticket stored in the IC card 20. The memory 112 is an example of a storage unit of the embodiment of the present invention.

The modulation/demodulation unit 114, the wireless communication unit 116 and the antenna 118 serve as a communication module by which the information processing device 10 transmits a prescribed command to the IC card 20 and the information processing device 10 receives a response from the IC card 20.

For example, in the case where the information processing device 10 writes data to the IC card 20, an output signal that contains a command designating data writing and data is output from the control unit 110 to the modulation/demodulation unit 114. The modulation/demodulation unit 114 modulates the output signal according to BPSK or the like, for example, and generates an ASK-modulated wave. Then, the modulation/demodulation unit 114 outputs the generated modulated wave to the wireless communication unit 116. The wireless communication unit 116 supplies the modulated wave input from the modulation/demodulation unit 114 to the antenna 118, and the output signal is transmitted from the antenna 118 by emission of an electromagnetic wave.

Further, in the case where the information processing device 10 reads data from the IC card 20, a command designating data reading is transmitted to the IC card 20, as in the case of data writing described above. Then, a response signal containing prescribed data is transmitted by return from the IC card 20 and received by the antenna 118. Then, the response signal (ASK-modulated wave) received by the antenna 118 is amplified by the wireless communication unit 116 and supplied to the modulation/demodulation unit 114. The modulation/demodulation unit 114 performs envelope detection of the modulated wave supplied from the wireless communication unit 116 and demodulates the modulated wave according to BPSK or the like, for example. Then, the modulation/demodulation unit 114 outputs the demodulated response signal to the control unit 110.

The light emitting unit 120 supplies light to an operating means that is mounted on the IC card held by the IC card holding unit 12 shown in FIG. 1 and is capable of switching display contents on the display unit of the IC card by a potential difference occurring due to photoelectric conversion. The operating means of the IC card corresponds to the operating unit (power generating unit) 42 of the IC card 20, which is described earlier with reference to FIG. 2, for example. Specifically, the light emitting unit 120 includes a light emitting element such as an LED (Light Emitting Diode) or a light emitter such as a fluorescent tube or an electric bulb, for example, which is capable of applying light to the operating unit 42 of the IC card 20 that is held by the IC card holding unit 12, for example. Then, the light emitting unit 120 applies light to the operating means of the IC card according control by the light emission adjusting unit 122, which is described later, and drives the display module of the IC card.

Further, the light emitting unit 120 can supply light to the operating means by a first light emitting pattern that drives the display unit of the IC card and a second light emitting pattern that switches display contents of the display unit of the IC card.

Referring to FIG. 2, the IC card 20 is inserted into the IC card holding unit 12 of the information processing device 10. At this time, the position of the IC card 20 may be such that the display unit 60 is visible for a user of the information processing device 10. Further, the position of the IC card 20 is adjusted in such a way that external light does not reach the operating unit 42.

Figure 8:
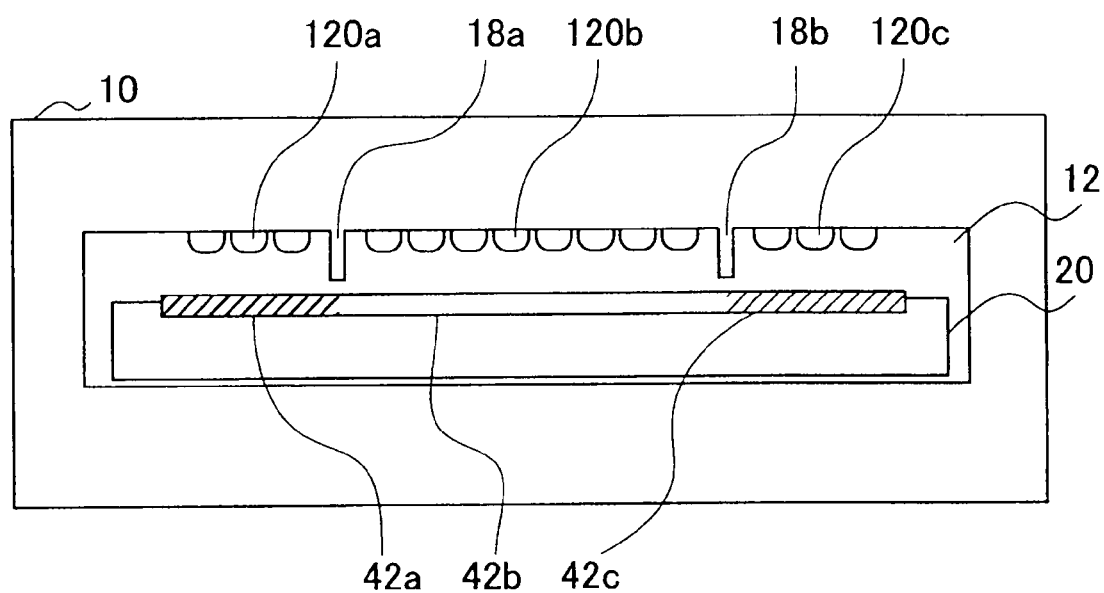
FIG. 8 is a schematic view showing an IC card according to an embodiment being held when viewed from the direction of card insertion.

Referring now to FIG. 8, the inside of the IC card holding unit 12 is described hereinafter. FIG. 8 is a schematic view showing the state where the inside of the IC card holding unit 12 is viewed from the direction of card insertion. Referring to FIG. 8, the IC card 20 that is held by the IC card holding unit 12 of the information processing device 10 is shown with the surface having the operating unit 42 (which is referred to hereinafter as an operating surface) facing up.

In FIG. 8, the operating unit 42 is divided into three operating sections 42a, 42b and 42c. The first operating section 42a corresponds to the cell 24g and the cell 24h of the operating unit 42 shown in FIG. 2, for example. The second operating section 42b corresponds to the cell 24c to the cell 24f of the operating unit 42 shown in FIG. 2, for example. The third operating section 42c corresponds to the cell 24a and the cell 24b of the operating unit 42 shown in FIG. 2, for example.

On the other hand, a plurality of light emitting elements included in the light emitting unit 120 are placed on the surface on the inside of the IC card holding unit 12 of the information processing device 10 which is placed opposite to the operating surface of the IC card 20. The light emitting elements are divided into three light emitting sections 120a, 120b and 120c by dividers 18a and 18b. The first light emitting section 120a is placed opposite to the first operating section 42a of the IC card 20. The second light emitting section 120b is placed opposite to the second operating section 42b of the IC card 20. The third light emitting section 120c is placed opposite to the third operating section 42c of the IC card 20.

With such three light emitting sections 120a, 120b and 120c, the light emitting unit 120 can apply light to the operating unit 42 of the IC card 20 with a prescribed light emitting pattern so as to switch the contents displayed on the display unit 60 of the IC card 20.

In FIG. 9, the divider 18a is placed in order that light from the first light emitting section 120a does not reach the second operating section 42b, and light from the second light emitting section 120b does not reach the first operating section 42a. Likewise, the divider 18b is placed in order that light from the second light emitting section 120b does not reach the third operating section 42c, and light from the third light emitting section 120c does not reach the second operating section 42b.

FIG. 9 is an explanatory view to describe a relationship between light emitting patterns by the light emitting unit 120 and details of an operation detected by the operating unit 42 of the IC card 20.

Referring to FIG. 9, four light emitting patterns A to D are defined. The light emitting pattern A indicates the state where all of the first light emitting section 120a, the second light emitting section 120b and the third light emitting section 120c are lighting up. In this pattern, light is applied to all the operating sections 42a to 42c of the operating unit 42 of the IC card 20, and therefore the IC card 20 can drive the display unit 60 by using power generated by the operating unit 42.

The light emitting pattern B indicates the state where the first light emitting section 120a is lighting off and the second light emitting section 120b and the third light emitting section 120c are lighting up. In this pattern, light is not applied to the first operating section 42a of the operating unit 42 of the IC card 20, and light is applied to the second operating section 42b and the third operating section 42c of the operating unit 42 of the IC card 20. This is the same state as when the cell 24g and the cell 24h are covered in the operating unit 42 of the IC card 20, and the IC card 20 switches the display contents on the display unit 60 in the direction of "next", for example.

The light emitting pattern C indicates the state where the first light emitting section 120a and the second light emitting section 120b are lighting up, and the third light emitting section 120c is lighting off. In this pattern, light is applied to the first operating section 42a and the second operating section 42b of the operating unit 42 of the IC card 20, and light is not applied to the third operating section 42c of the operating unit 42 of the IC card 20. This is the same state as when the cell 24a and the cell 24b are covered in the operating unit 42 of the IC card 20, and the IC card 20 switches the display contents on the display unit 60 in the direction of "back", for example.

The light emitting pattern D indicates the state where all of the first light emitting section 120a, the second light emitting section 120b and the third light emitting section 120c are lighting off. In this pattern, light is not applied to any of the operating sections 42a to 42c of the operating unit 42 of the IC card 20, and therefore the IC card 20 cannot drive the display unit 60 unless power accumulated in the power accumulating unit 44 remains, for example.

FIG. 9 shows the case of controlling supply of light to the IC card 20 by turning on or off the light emitting elements included in the light emitting unit 120 with respect to each light emitting section. However, a method of controlling supply of light to the IC card 20 is not limited thereto. For example, a shutter may be placed at the front of each light emitting section, and supply of light to the IC card 20 may be controlled by opening or closing the shutter.

The number, shape and position of light emitting sections of the light emitting unit 120 and the number of dividers can be set according to the specifications of the number, shape and position of operating sections of the operating unit 42 of the IC card 20 or the like. For example, if only the "next" operation is recognizable in the operating unit 42, the number of light emitting sections of the light emitting unit 120 may be two, and the number of dividers may be one. Further, a plurality of light emitting patterns may be prepared for one operation in order to be compatible with use of a plurality of different IC cards in the information processing device 10, for example.

Referring back to FIG. 7, an example of a logical configuration of the information processing device 10 is further described. The light emission adjusting unit 122 allows the data recorded on the IC card 20 by the control unit 110 through the modulation/demodulation unit 114, the wireless communication unit 116 and the antenna 118 to be displayed on the display unit 60 of the IC card 20 by adjusting the number of times of emitting light or the light emitting pattern by the light emitting unit 120. Specifically, the light emission adjusting unit 122 acquires information of an electronic ticket corresponding to service identification information based on a determination result of the determination unit 113. As described earlier, the light emission adjusting unit 122 is provided with an address at which the electronic ticket is written from the determination unit 113.

Then, the light emission adjusting unit 122 determines the number of times of emitting light or the light emitting pattern by the light emitting unit 120 so as to make switch to the acquired information of the electronic ticket. The light emission adjusting unit 122 then supplies light from the light emitting unit 120 to the IC card 20 by the determined number of times of emitting light or light emitting pattern. As a result, the contents displayed on the display unit 60 of the IC card 20 is switched to the information of the electronic ticket corresponding to the service identification information. It is thereby possible for a user to display the IC ticket suitable for the peripheral environment from information of electronic tickets stored in the IC card 20 without manipulating the operating unit 42 for retrieving the information to be displayed. The function of the light emission adjusting unit 122 described above may be directly executed by the control unit 110.

Further, while the control unit 110 performs communication with the IC card 20 through the modulation/demodulation unit 114, the wireless communication unit 116 and the antenna 118, the light emission adjusting unit 122 stops supply of light from the light emitting unit 120 to the IC card 20 by applying the light emitting pattern D of FIG. 9, for example. Likewise, while light is supplied from the light emitting unit 120 to the IC card 20 under control of the light emission adjusting unit 122, the control unit 110 stops communication with the IC card 20. It is thereby possible to prevent the occurrence of processing error or data inconsistency within the IC card 20 due to simultaneous access to the IC card module 30 between the display module 50 and the external device (the information processing device 10) in the IC card 20.

Information of electronic tickets that is stored in the IC card 20 and service identification information that is stored in the storage unit (memory 112) of the information processing device 10 are specifically described hereinafter with reference to FIGS. 10 and 11.

FIG. 10 is an explanatory view to describe specific contents of electronic tickets stored in the IC card 20. Referring to FIG. 10, information 400 of electronic tickets contains information that is written upon issue of an electronic ticket, information that is written upon entrance to an automatic ticket gate, information that is written upon exit from an automatic ticket gate and so on.

Among the information of electronic tickets, the information that is written upon issue of an electronic ticket involves a use status 4001, a purchase date 4002, an expected use date 4003, a service code 4005, a use place 4006, time 4007 or the like. The information that is written upon entrance to an automatic ticket gate involves a use date 4004, an in-use flag (not shown) or the like. The information that is written upon exit from an automatic ticket gate involves a used flag (not shown) or the like.

Among the information 400 of electronic tickets stored in the IC card 20, information different from information not necessary for a user to view, such as flag information and a service code, is displayed on the display unit of the IC card 20. As described earlier, not all information of electronic tickets can be displayed on the display unit of the IC card 20. Therefore, selected information of an electronic ticket from the information 400 of electronic tickets is displayed on the display unit of the IC card 20. A user then moves the display of the information of the electronic ticket on the display unit of the IC card 20 forward or backward by manipulating the operating unit 42 of the IC card 20. By such manipulation, a user can make the information 400 of a desired electronic ticket displayed on the display unit of the IC card 20 and check it.

Next, specific contents of service identification information that is stored in the storage unit (memory 112) of the information processing device 10 are described hereinafter with reference to FIG. 11. FIG. 11 is an explanatory view to describe specific contents of service identification information stored in the storage unit (memory 112) of the information processing device 10.

For example, in the case where the information processing device 10 is installed near ticket gates at Tokyo station, service identification information 501 shown in FIG. 11 may be stored. Specifically, a service code 5012 indicating a reserved seat ticket issuing service for an express train, current time 5011 or the like is stored as the service identification information 501 stored in the memory 112 of the information processing device 10 which is installed near ticket gates at Tokyo station. In this case, "ticket 2" with a service code of "1000" and closest to the current time "10:39" is selected from the electronic tickets stored in the IC card 20 shown in FIG. 10 and displayed.

For another example, in the case where the information processing device 10 is installed on the platform at Tokyo station, service identification information 502 shown in FIG. 11 may be stored. Specifically, a service code 5022 indicating a reserved seat ticket issuing service for an express train, a train name 5024 to be departed from the platform, departure time 5023, current time 5021 or the like is stored as the service identification information 502 stored in the memory 112 of the information processing device 10 which is installed on the platform at Tokyo station. In this case, "ticket 2" with a service code of "1000", a train name of "YAMABUSHI 35" and departure time of "12:00" is selected from the electronic tickets stored in the IC card 20 shown in FIG. 10 and displayed.

For yet another example, in the case where the information processing device 10 is installed at a movie theater in Shibuya city, service identification information 503 shown in FIG. 11 may be stored. Specifically, a service code 5032 indicating a reserved seat ticket issuing service for a movie theater, a code 5033 of the movie theater, start time 5034, a movie title 5035, current time 5031 or the like is stored as the service identification information 503 stored in the memory 112 of the information processing device 10 which is installed at a movie theater in Shibuya city. In this case, "ticket 3" with a service code of "2000", a movie theater code of "2005" and a movie title (attribute information) of "movie 1" is selected from the electronic tickets stored in the IC card 20 shown in FIG. 10 and displayed.

Further, the information processing device 10 may be installed at a department store. In this case, a service code indicating a coupon issuing service to be used at a department store or the like and a code identifying a department store or a specific store in a department store may be stored as the service identification information. Further, in addition to display of an electronic coupon, amount information such as the balance of the electronic coupon may be displayed.

[5] Operation of Information Processing Device

Figure 12:
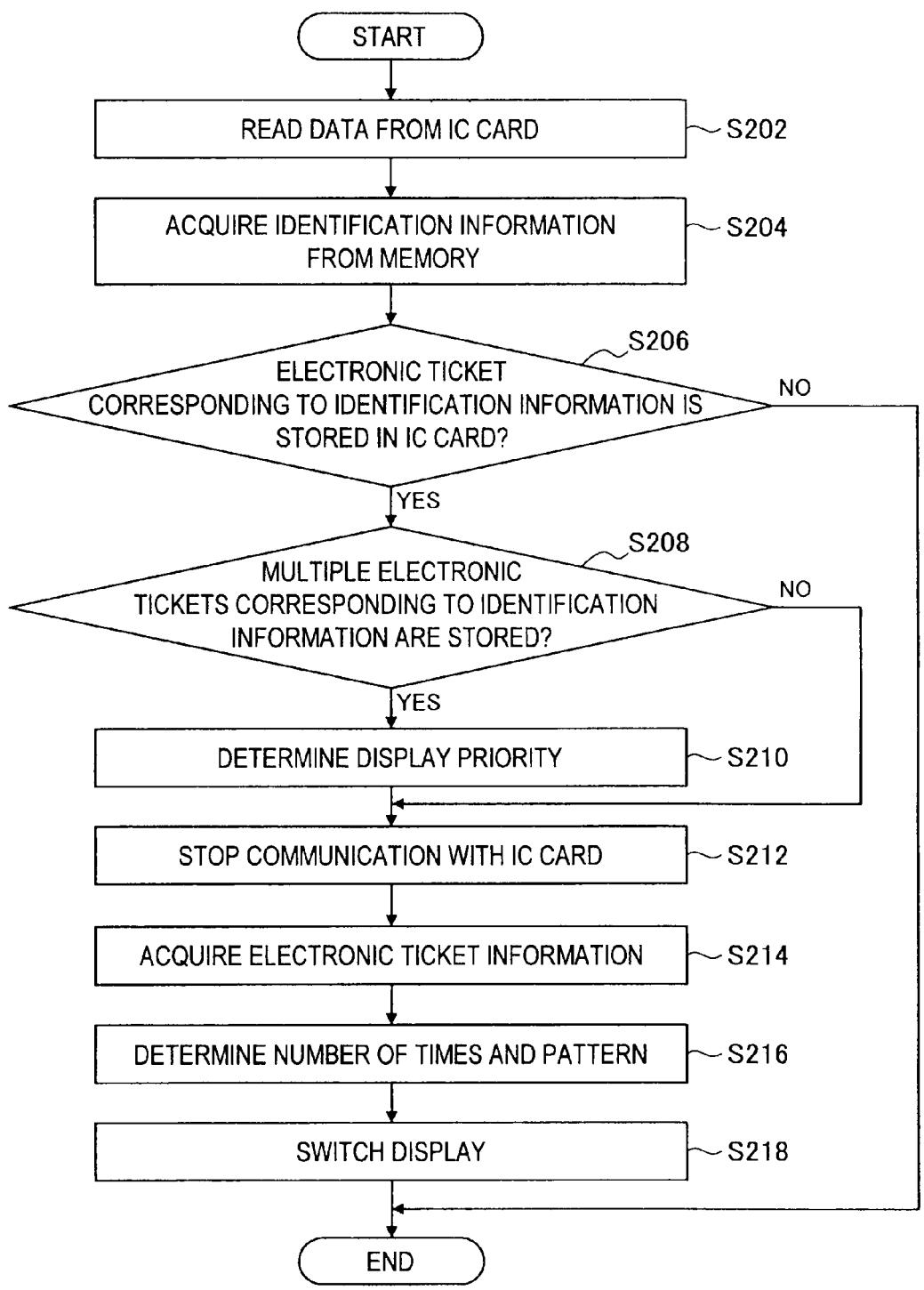
FIG. 12 is a flowchart showing a flow of display switching processing by an information processing device according to an embodiment.

The configuration of the information processing device 10 according to the embodiment of the present invention is described above with reference to FIGS. 7 to 11. Referring then to FIG. 12, an example of a flow of display switching processing that is executed in such a configuration is described hereinbelow. FIG. 12 is a flowchart showing an example of a flow of display switching processing by the information processing device 10 according to the embodiment of the present invention. The following description is based on an assumption that the IC card 20 has a function of displaying electronic ticket information and display on the IC card 20 is switched when a user inserts the IC card 20 into the information processing device 10.

Referring to FIG. 12, if the IC card 20 is inserted into the IC card holding unit 12 of the information processing device 10 by a user, the presence of the IC card 20 is detected by a sensor or the like, which is not shown, and reading of data from the IC card 20 is executed by the reading unit 111 of the information processing device 10 (S202). In the step S202, the light emission adjusting unit 122 turns off all the light emitting elements of the light emitting unit 120 and thereby stops supply of light to the IC card 20.

Next, the determination unit 113 acquires service identification information that is stored in the memory 112 of the information processing device 10 (S204). Then, the determination unit 113 determines whether an electronic ticket corresponding to the service identification information acquired in the step S204 is stored in the IC card 20 read in the step S202 (S206).

If it is determined in the step S206 that the electronic ticket corresponding to the service identification information is stored in the IC card 20, it is further determined whether a plurality of such electronic tickets exist or not (S208). On the other hand, if it is determined in the step S206 that the electronic ticket corresponding to the service identification information is not stored in the IC card 20, the process ends.

If it is determined in the step S208 that a plurality of electronic tickets corresponding to the service identification information exist, the display priorities of the plurality of electronic tickets are determined (S210). The display priorities of the electronic tickets may be determined according to a display sequence selected by a user's operation or determined according to a predetermined display sequence, such as a sequence of time information or a sequence of purchase date.

On the other hand, if it is determined in the step S208 that a plurality of electronic tickets corresponding to the service identification information do not exist, the process proceeds to the step S212. Then, the control unit 110 stops communication with the IC card 20 (S212).

After that, the light emission adjusting unit 122 acquires information of the electronic ticket corresponding to the service identification information which is specified based on a determination result in the step S206 or S208 (S214). The light emission adjusting unit 122 then determines the number of times of emitting light or the light emitting pattern by the light emitting unit 120 so as to make switch to the information of the electronic ticket acquired in the step S214 (S216).

It is assumed, for example, that the write location is the m-th location in the electronic ticket information write area on the card memory 40, and the display module 50 of the IC card 20 displays the electronic ticket information simply in the sequence of memory. In this case, the light emission adjusting unit 122 determines to repeat light emission by the light emitting pattern B and the light emitting pattern A alternately m number of times after light emission by the light emitting pattern A shown in FIG. 10. Alternatively, the light emission adjusting unit 122 may acquire the contents of the display sequence table acquired from the IC card 20 by the control unit 110, for example, and determine the number of times of emitting light and the light emitting pattern according to the contents of the display sequence table.

Then, the light emission adjusting unit 122 switches display by sequentially repeating light emission by the light emitting unit 120 according to the determined number of times of emitting light and light emitting pattern (S218). For example, the light emission adjusting unit 122 first supplies light to all the operating sections 42$a$ to 42$c$ of the IC card 20 by the light emitting pattern A. Power is thereby accumulated in the power accumulating unit 44 of the IC card 20, and the display module 50 is activated.

Then, the display data on the card memory 40 is captured onto the display memory 56 by the display CPU 54. At this time, the initial display data, for example, is displayed on the display unit 60 of the IC card 20. Next, the light emission adjusting unit 122 repeats light emission by the light emitting pattern B (display switch "next") and light emission by the light emitting pattern A (all light-up) m number of times and switches the display contents on the display unit 60 of the IC card 20 to the m-th electronic ticket information. It is thereby possible to display the IC ticket suitable for the peripheral information without the need for a user to manipulate the operating unit 42 in order to retrieve the information to be displayed from the information of electronic tickets stored in the IC card 20.

In the step S218, there is a possibility that an error in which the display contents on the display unit 60 of the IC card 20 cannot be switched an appropriate number of times occurs due to delay of sampling a potential difference in the operating unit 42 of the IC card 20, for example. In light of this, the information processing device 10 may be configured in such a way that a user can further give an instruction for supply of light from the light emitting unit 120 with a prescribed light emitting pattern through the key input unit 16 of the information processing device 10, for example. A user can thereby make an IC ticket suitable for the peripheral environment displayed without directly manipulating the operating unit 42 of the IC card 20, even when the above error occurs, by giving a supplementary instruction. The follow of display switching processing in the information processing device 10 is described in the foregoing.

The information processing device 10 according to the embodiment includes the modulation/demodulation unit 114, the wireless communication unit 116 and the antenna 118 for transmitting given data to the IC card 20 and recording the data thereon, and the light emitting unit 120 for driving the display module 50 of the IC card 20. The reading unit 111 reads information of one or more than one electronic tickets stored in the IC card 20. The determination unit 113 determines whether information of an electronic ticket corresponding to service identification information for identifying a service related to an electronic ticket that is stored in the information processing device 10 is stored in the IC card 20 or not. As a result of the determination, if the information of the electronic ticket corresponding to the service identification information is stored, the light emission adjusting unit 122 adjusts the number of times of emitting light or the light emitting pattern by the light emitting unit 120 so as to switch the display on the display screen of the IC card 20 to the information of the corresponding electronic ticket.

It is thereby possible for a user to automatically display electronic ticket information suitable for the peripheral environment such as the user's location or current time on the display unit of the IC card 20 simply by inserting the IC card 20 into the IC card holding unit 12 of the information processing device 10. The user can thereby check the information of the electronic ticket suitable for the peripheral environment without need for particular manipulation.

It should be understood by those skilled in the art that various modifications, combinations, sub-combinations and alterations may occur depending on design requirements and other factors insofar as they are within the scope of the appended claims or the equivalents thereof.

For example, although switching of information of an electronic ticket displayed on the display unit of the IC card 20 is made by adjusting the number of times of emitting light or the light emitting pattern by the light emitting unit 120 in the above-described embodiment, the present invention is not limited thereto. For example, an electronic ticket with a high display priority may be displayed after changing the display sequence of display data recorded on the display memory 56 in the IC card 20.

Further, if there are a plurality of electronic tickets corresponding to the service identification information stored in the information processing device 10, a user may select an electronic ticket to be displayed. In this case, a plurality of electronic tickets corresponding to the service identification information may be displayed on the display unit of the information processing device 10, so that a user selects one by the key input unit 16 of the information processing device 10.

The present application contains subject matter related to that disclosed in Japanese Priority Patent Application JP 2008-320220 filed in the Japan Patent Office on Dec. 16, 2008, the entire content of which is hereby incorporated by reference.

What is claimed is:

1. An information processing device comprising:
   a light emitting unit to supply light to an operating unit mounted on an IC card and capable of switching display contents on a display unit of the IC card by a potential difference occurring due to photoelectric conversion;
   a light emission adjusting unit to cause information of an electronic ticket recorded on the IC card to be displayed on the display unit of the IC card by adjusting the number of times of emitting light or a light emitting pattern by the light emitting unit;
   a storage unit to store service identification information for identifying a service related to an electronic ticket; and
   a reading unit to read information of one or more than one electronic ticket stored in the IC card, wherein
   the light emission adjusting unit adjusts the number of times of emitting light or the light emitting pattern by the light emitting unit so as to switch display on a display screen of the IC card to the information of the electronic ticket corresponding to the service identification information, and
   the light emitting unit is capable of supplying light to the operating unit by a first light emitting pattern for driving the display unit of the IC card and a second light emitting pattern for switching display contents on the display unit of the IC card.

2. The information processing device according to claim 1, further comprising:
   a determination unit to determine whether the information of the electronic ticket corresponding to the service identification information stored in the storage unit matches the information of one or more than one electronic ticket read by the reading unit, wherein
   the light emission adjusting unit adjusts the number of times of emitting light or the light emitting pattern by the light emitting unit so as to switch display on the display screen of the IC card to the information of the electronic ticket corresponding to the service identification information based on a determination result of the determination unit.

3. The information processing device according to claim 1, wherein
   the reading unit acquires a stored location of one or more than one electronic ticket on memory of the IC card, and
   the light emission adjusting unit determines the number of times of emitting light or the light emitting pattern by the light emitting unit according to the stored location of the information of the electronic ticket corresponding to the service identification information.

4. The information processing device according to claim 1, wherein
the information of an electronic ticket contains at least one information of a kind, a use date and a use place of the electronic ticket, and
the service identification information contains at least one information of a kind, time information and place information of the electronic ticket.

5. The information processing device according to claim 4, wherein
the light emission adjusting unit switches display on the display screen of the IC card to the information of the electronic ticket if it is determined that the information of the electronic ticket corresponding to the kind, time information and place information of the electronic ticket contained in the service identification information entirely or partly match the information stored in the IC card.

6. The information processing device according to claim 1, wherein
the IC card incorporates an IC chip capable of contactless communication with the information processing device, and
the information processing device is a reader/writer capable of contactless communication with the IC card.

7. An information processing device comprising:
a light emitting unit to supply light to an operating unit mounted on an IC card and capable of switching display contents on a display unit of the IC card by a potential difference occurring due to photoelectric conversion;
a light emission adjusting unit to cause information of an electronic ticket recorded on the IC card to be displayed on the display unit of the IC card by adjusting the number of times of emitting light or a light emitting pattern by the light emitting unit;
a storage unit to store service identification information for identifying a service related to an electronic ticket; and
a reading unit to read information of one or more than one electronic ticket stored in the IC card, wherein
the light emission adjusting unit adjusts the number of times of emitting light or the light emitting pattern by the light emitting unit so as to switch display on a display screen of the IC card to the information of the electronic ticket corresponding to the service identification information, and
the light emission adjusting unit stops supply of light from the light emitting unit while the information processing device communicates with the IC card.

8. An information processing device comprising:
a light emitting unit to supply light to an operating unit mounted on an IC card and capable of switching display contents on a display unit of the IC card by a potential difference occurring due to photoelectric conversion;
a light emission adjusting unit to cause information of an electronic ticket recorded on the IC card to be displayed on the display unit of the IC card by adjusting the number of times of emitting light or a light emitting pattern by the light emitting unit;
a storage unit to store service identification information for identifying a service related to an electronic ticket; and
a reading unit to read information of one or more than one electronic ticket stored in the IC card, wherein
the light emission adjusting unit adjusts the number of times of emitting light or the light emitting pattern by the light emitting unit so as to switch display on a display screen of the IC card to the information of the electronic ticket corresponding to the service identification information, and
the reading unit stops communication between the IC card and the information processing device while light is supplied from the light emitting unit to the operating unit of the IC card.

* * * * *